Figure 1:
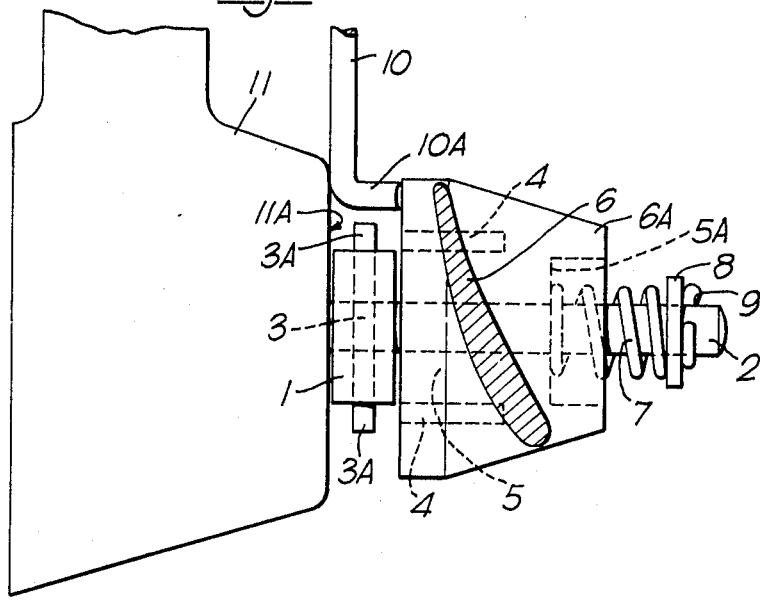

United States Patent [19]

Cowie

[11] 4,271,781
[45] Jun. 9, 1981

[54] OUTBOARD MOTOR CLUTCHES

[76] Inventor: David B. Cowie, 18 Monteith Dr., Clarkston, Renfrewshire, Scotland

[21] Appl. No.: 955,479

[22] Filed: Oct. 25, 1978

[51] Int. Cl.³ .................................... B63H 23/30
[52] U.S. Cl. .................................. 440/113; 29/401.1;
29/426.5; 29/428; 192/67 R; 192/89 A; 192/93 R; 416/133; 416/169 R
[58] Field of Search ............... 192/67 R, 89 A, 47, 192/93 R; 115/17, 76, 18 R, 34; 416/32, 169 R, 169 A, 133; 415/122 R, 123; 29/401.1, 428, 426.5; 403/1

[56] References Cited

U.S. PATENT DOCUMENTS

| 449,087 | 3/1891 | Prest | 192/93 |
|---|---|---|---|
| 1,405,927 | 2/1922 | Lauth | 192/89 A X |
| 1,472,077 | 10/1923 | Lockwood | 416/133 |
| 1,864,716 | 6/1932 | Doremus | 416/133 |
| 2,728,320 | 12/1955 | Kloss | 115/18 R |
| 3,216,392 | 11/1965 | Shimanckas | 115/18 R X |

FOREIGN PATENT DOCUMENTS

| 489441 | 8/1938 | United Kingdom . |
|---|---|---|
| 875197 | 8/1961 | United Kingdom . |
| 1530697 | 11/1978 | United Kingdom . |

Primary Examiner—George H. Krizmanich
Assistant Examiner—Moshe I. Cohen
Attorney, Agent, or Firm—Mason, Fenwick & Lawrence

[57] ABSTRACT

An outboard motor propulsion unit which is manufactured and sold without a clutch is provided thereafter with a clutch, as follows. The spring connecting the propeller to the output shaft is removed. Interengageable clutch members are fitted to the thrust bearing and to the hub of the propeller. A spring is fitted to the output shaft so as to urge the propeller along the shaft to effect driving engagement of the clutch members, and a manual control member is provided for effecting disengagement of the clutch.

10 Claims, 6 Drawing Figures

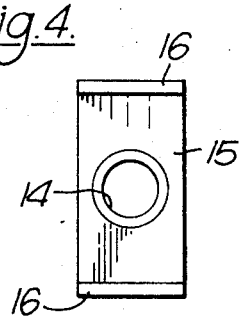
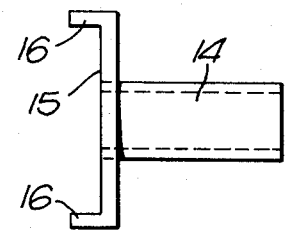
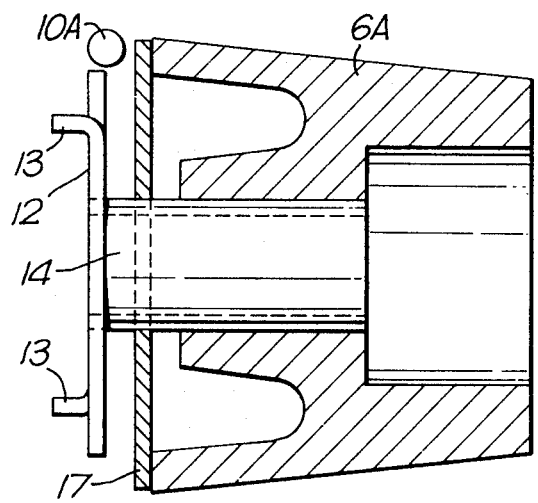

OUTBOARD MOTOR CLUTCHES

This invention relates to outboard motor propulsion units for watercraft.

According to the present invention an outboard motor propulsion unit for a watercraft is provided with a clutch between the output shaft of the unit and the propeller, said clutch comprising a thrust bearing secured to said shaft, interengageable clutch members on the thrust bearing and on the hub of the propeller, a spring urging the propeller axially along the shaft towards the thrust bearing to effect driving engagement of said members, and a manual control member for effecting disengagement of said members and permitting engagement.

Further, according to the present invention a method of providing a known clutchless outboard motor propulsion unit for a watercraft with a clutch, comprises replacing the pin securing the thrust bearing to the output shaft with a longer pin so that it projects radially from the bearing, locating at least one member in the propeller hub projecting towards said bearing in such a manner as to be engageable with a projecting portion of said pin of the thrust bearing, providing a spring on said output shaft urging the propeller along the shaft towards the thrust bearing so as to effect driving engagement between said pin and said member, and providing a manually operable control for effecting disengagement of said pin and said member and permitting driving engagement thereof.

Figure 2:
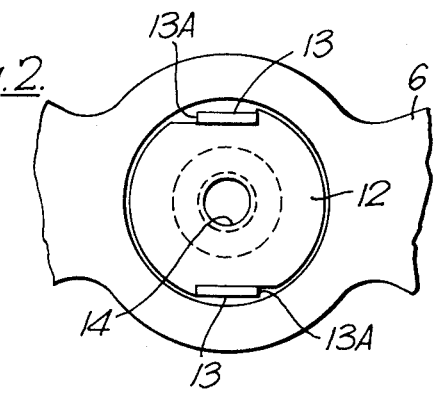
Figure 3:
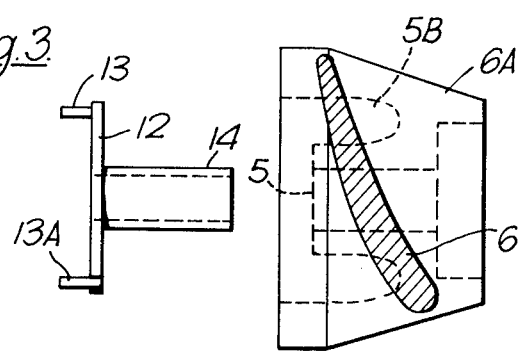

An embodiment of the invention will now be described, by way of example, with reference to the accompanying diagrammatic drawing, in which:

FIG. 1 is a fragmentary side view of an outboard motor propulsion unit provided with a clutch according to the present invention, and, FIG. 2 is a fragmentary front view of a propeller showing a modification in part of the clutch, FIG. 3 is an exploded view corresponding to FIG. 2, FIG. 4 is a front view showing a further modification in part of the clutch, FIG. 5 is a side view corresponding to FIG. 4, and FIG. 6 is a sectional view of the propeller, showing a further modification.

Referring to FIG. 1 of the drawing, a known outboard motor propulsion unit, of which only a lower part is shown, and which did not hitherto have a clutch is provided with a clutch, as follows.

The conventional pin securing the thrust bearing 1 to the output shaft 2 is replaced by a longer pin 3 so that it provides diametrally opposed radial projections 3A. Diametrally opposed screw-threaded pins 4 are inserted into the countersunk face 5 of the hub 6A of the propeller 6 so that the pins 4 project axially therefrom at such a radius as to be engageable with the projections 3A. The spring which hitherto connected the propeller and the output shaft is replaced by a compression spring 7 which at one end abuts the other countersunk face 5A of the hub 6A and at the other end abuts the collar or washer 8 on the shaft 2, the washer 8, in turn, abutting a split pin 9 passing through a hole in the shaft 2. A manually operable control member is provided for effecting disengagement of the clutch and permitting engagement. Said control member consists of an upstanding rod 10 extending substantially parallel to the drive shaft of the motor and secured to the unit by upper and lower clips or brackets (not shown) which permit rotary adjustment of the rod about its longitudinal axis. At its lower end, the rod has a lug or foot 10A angled relative thereto and lying between the outer face of the propeller hub 6A and the opposed face 11A of the casing 11 from which the output shaft 2 projects. In the position shown in the drawing, the rod 10 is so turned that the lug 10A has pushed the hub 6A to the right so that the pins 4 lie clear of the projections 3A and the clutch is disengaged. In order to engage the clutch, the rod is turned so that the lug 10A extends parallel to the face 11A and lies clear of the adjacent end face of the hub 6A, and the spring 7 urges the hub 6A along the shaft to the left so that the pins 4 engage the projections 3A. A hand lever, not shown, is provided at the upper end of the rod 10, and is movable between stops, which may be formed by existing parts of the motor casing. The upper bracket for the rod 10 may also be located by an already existing bolt on the motor casing.

As a result of the invention, known clutchless outboard motor units can be provided with a clutch in a very simple and inexpensive manner, and by unskilled labour. The provision of a clutch makes the outboard motor unit safer in use, and more versatile, and enables easier starting of the motor as the load of driving the propeller can be eliminated by disengaging the clutch.

Various modifications may be made without departing from the scope of the invention. For example, the pin 3 can be designed so as to shear in the event of the propeller striking a serious obstruction, the pin 3 being easily replaceable.

The outboard motor units may be made and sold with the clutch fitted, or the clutch parts comprising the control member 10, its brackets, the pins 3 and 4, the spring 7, the washer 8 and the split pin 9 may be sold as a kit of parts.

In the modification shown in FIGS. 2 and 3, the countersunk face 5 of the propeller hub 6A is surrounded by a recess 5B, and it may not be possible to employ the pins 4. In the case, the clutch member on the hub 6 is formed by a disc-shaped plate 12 having diametrally opposed bent-over lugs 13 which project towards the projections 3A of the pin 3 and have axially extending faces 13A engageable by the projections 3A. The disc 12 has a central hole and is secured to a bush 14 concentric with said hole, and the bush 14 is a tight fit in the bore of the hub 6A from which the previously existing bush has been removed.

The disc 12 may be replaced by a rectangular plate 15 having right-angled flanges 16, FIGS. 4 and 5, for engagement by the projections 3A of the pin 3.

FIG. 6 is a sectional view corresponding to FIG. 3, with the clutch part 12, 13, 14 fitted to the propeller hub 6A, and showing a replaceable, circular wear plate 17 secured to the bush 14 and abutting the adjacent end face of the hub 6A. In a similar manner, the bush 14 in FIGS. 4 and 5 may carry a wear plate. The plate 17 prevents the lug 10A of the clutch control member from causing wear on the end face of the hub 6, and may allow some shrouded propellers to be used with the clutch. A wear plate may also be provided in the FIG. 1 embodiment, in which case the wear plate would be annular.

I claim:

1. An outboard motor propulsion unit for a watercraft provided with a clutch between the output shaft of the unit and the propeller, said clutch comprising a thrust bearing secured to said shaft, interengageable clutch members on the thrust bearing and on the hub of the propeller, a spring urging the propeller axially along the shaft towards the thrust bearing to effect driving engagement of said members, and a manual control member for effecting disengagement of said members and permitting engagement.

2. An outboard motor propulsion unit as claimed in claim 1, in which said control member comprises an upstanding rod extending substantially parallel to the drive shaft of the motor of the unit, and secured to the unit so as to be rotatably adjustable axially, and having at its lower end a lug or foot projecting between opposed faces of the propeller hub and of the casing of the unit.

3. An outboard motor propulsion unit as claimed in claim 1, in which one of said clutch members is a pin securing the thrust bearing to the shaft and projecting radially from the thrust bearing at diametrally opposed points.

4. An outboard motor propulsion unit as claimed in claim 3, in which said pin is designed to shear under a predetermined load commensurate with the propeller striking a serious obstruction.

5. An outboard motor propulsion unit as claimed in claim 1 or 3, in which the clutch members on the hub of the propeller comprise two diametrally opposed pins projecting axially from an end face of the propeller hub in the direction of the clutch members on the thrust bearing.

6. An outboard motor propulsion unit as claimed in claim 1 or 3, in which the clutch member on the hub of the propeller comprises a plate having a central hole, a bush concentric with said hole and fitted into the bore of said hub, and lugs diametrally opposed about said hole, said lugs projecting towards and having axially extending faces engageable by the clutch members on the thrust bearing.

7. An outboard motor propulsion unit as claimed in claim 6, in which said bush carries a wear plate which prevents the clutch control member from abutting and causing wear on the end face of the propeller hub.

8. An outboard motor propulsion unit for a watercraft provided with a clutch between an output shaft having a thrust bearing mounted thereon of the unit and a propeller having a hub, said clutch comprising interengageable clutch members on the thrust bearing and on the hub of the propeller, a spring urging the propeller axially along the shaft for effecting driving engagement of said clutch members, and a manual control member for effecting disengagement of said members and permitting engagement.

9. A method of providing a known clutchless outboard motor propulsion unit for a watercraft with a clutch, comprising replacing the pin securing the thrust bearing to the output shaft with a longer pin so that it projects radially from the bearing, locating at least one member in the propeller hub projecting towards said bearing in such a manner as to be engageable with a projecting portion of said pin of the thrust bearing, providing a spring on said output shaft urging the propeller along the shaft towards the thrust bearing so as to effect driving engagement between said pin and said member, and providing a manually operable control for effecting disengagement of said pin and said member and permitting driving engagement thereof.

10. A method of providing a known clutchless outboard motor propulsion unit for a watercraft with a clutch, comprising removing the spring connecting the propeller to the output shaft, fitting interengageable clutch members to the output shaft and to the propeller hub, providing a spring on said output shaft urging the propeller along the shaft for effecting driving engagement between said clutch members, and providing a manually operable control for effecting disengagement of the clutch.

* * * * *